(12) United States Patent
Kiest, Jr.

(10) Patent No.: US 9,341,302 B2
(45) Date of Patent: May 17, 2016

(54) MEANS AND METHOD FOR LINING A PIPE

(71) Applicant: LMK TECHNOLOGIES, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 54 days.

(21) Appl. No.: 13/792,289

(22) Filed: Mar. 11, 2013

(65) Prior Publication Data

US 2014/0102576 A1 Apr. 17, 2014

Related U.S. Application Data

(60) Provisional application No. 61/714,551, filed on Oct. 16, 2012.

(51) Int. Cl.

| *F16L 55/163* | (2006.01) |
| *F16L 55/18* | (2006.01) |
| *F16L 55/179* | (2006.01) |
| *F16L 55/26* | (2006.01) |

(Continued)

(52) U.S. Cl.
CPC ........... *F16L 55/163* (2013.01); *F16L 55/1651* (2013.01); *F16L 55/179* (2013.01); *F16L 55/18* (2013.01); *F16L 55/265* (2013.01); *F16L 2101/18* (2013.01)

(58) Field of Classification Search
CPC ..... F16L 55/15; F16L 55/179; F16L 55/1651; F16L 55/163
USPC ...................................... 138/97, 98
See application file for complete search history.

(56) References Cited

U.S. PATENT DOCUMENTS 5,950,682 A * 9/1999 Kiest, Jr. .......................... 138/98
6,427,602 B1 * 8/2002 Hovis et al. ................ 104/138.1

(Continued)

FOREIGN PATENT DOCUMENTS

DE 102011013597 9/2012

OTHER PUBLICATIONS

LMK Technologies, LLC, PCT/US2013/064015 filed Oct. 9, 2013, "The International Search Report and the Written Opinion of the International Searching Authority, or the Declaration", mail date Mar. 21, 2014.

(Continued)

*Primary Examiner* — Kevin P Shaver
*Assistant Examiner* — Vishal Pancholi
(74) *Attorney, Agent, or Firm* — Nyemaster Goode, P.C.

(57) ABSTRACT

A method and means for repairing the junction of a main and lateral pipe are provided. A repair assembly includes a launcher device, a bladder assembly surrounding the launcher device, and a liner assembly surrounding the bladder assembly. The bladder assembly is frangibly connected to the launcher device to maintain the position of the bladder assembly relative to the launcher device during transport and positioning of the assembly. Likewise, the liner assembly, which includes main and lateral liner members, is frangibly connected to the bladder assembly. The frangible connections allow the position of the repair assembly to be maintained. The frangible connections can be broken, such as by inflation and/or tearing or pulling apart of the components of the repair assembly. Thus, the invention provides a way to mitigate the movement of components of the repair assembly during transport and positioning of the repair assembly.

21 Claims, 7 Drawing Sheets

(51) Int. Cl.
*F16L 55/165* (2006.01)
*F16L 101/18* (2006.01)

(56) References Cited

U.S. PATENT DOCUMENTS

| | | | | |
|---|---|---|---|---|
| 6,966,950 | B2* | 11/2005 | Winiewicz et al. | 118/712 |
| 7,628,177 | B2* | 12/2009 | Lepola | 138/98 |
| 2005/0121092 | A1* | 6/2005 | Kiest et al. | 138/98 |
| 2009/0056823 | A1* | 3/2009 | Kiest, Jr. | 138/98 |
| 2009/0095355 | A1 | 4/2009 | Kiest | |
| 2010/0043903 | A1* | 2/2010 | Muhlin | 138/98 |
| 2011/0197413 | A1 | 8/2011 | Kiest, Jr. | |
| 2011/0203719 | A1* | 8/2011 | Kiest, Jr. | 156/94 |
| 2011/0259461 | A1 | 10/2011 | Kiest | |
| 2012/0006440 | A1 | 1/2012 | Kiest | |
| 2012/0084956 | A1* | 4/2012 | Kiest, Jr. | 29/402.09 |

OTHER PUBLICATIONS

Written Opinion for International (PCT) Patent Application No. PCT/US2013/064015, issued Apr. 30, 2015.

* cited by examiner

MEANS AND METHOD FOR LINING A PIPE

CROSS-REFERENCE TO RELATED APPLICATIONS

This application claims priority under 35 U.S.C. §119 to provisional application Ser. No. 61/714,551, filed Oct. 16, 2012, which is herein incorporated by reference in its entirety.

FIELD OF THE INVENTION

The invention is relates generally to pipe repair. More specifically, but not exclusively, the invention relates to a means and method for repairing a pipe that increases the accuracy and efficiency of aligning a liner assembly with a pipe structure to be repaired.

BACKGROUND OF THE INVENTION

Prior methods for repairing damaged portions of pipelines include moving a liner tube impregnated with a liquid material capable of curing and hardening to a position within the pipe where the damaged portion is located. The liner tube is installed by pulling, pushing, or everting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by chemical mixtures that generate an exothermic reaction, the use of ultraviolet light or other photo curing initiators, or by electron beam curing. The liner tube forms an interior liner in the pipe for the pipeline being repaired. One such process is known as cured-in-place pipelining.

In most pipelines, lateral or branch pipes are connected to main pipes. In sewer systems, the connection of a lateral pipe to a main sewer pipe is accomplished by forming a hole in the main line with a hammer. The lateral pipe is then simply abutted against the hole, and then the juncture is covered with mortar, dirt, or the like. Damage or leaking can occur at the junction between the lateral pipe and the main pipe, which is generally known as one of the weakest points in a collection sewer system. T-shaped or Y-shaped liner tubes have been utilized to fit within the junction between the lateral and main pipes. Liner tubes form a T-shaped or Y-shaped liner after hardening to the interior of the junction between the pipes. Again, inflation bladders are typically used to pressurize the liners against the interior walls of the host pipes.

The repair assembly may include a scrim-reinforced bladder assembly including an inflatable main bladder that is sized close (≤10%) to the inner diameter of the pipe without stretching the bladder, and a lateral bladder that is inserted into a lateral pipe. The main and lateral bladders may be fluidly connected, or they may each have their own air supply conduit. The scrim, which provides reinforcement to the bladder, also limits stretch and prevents the bladder from bursting under pressure. For example, a bladder for a 24-inch pipeline would measure approximately from 21-inch to 24-inch in diameter. The bladder is positioned over a launcher, which can have an outside diameter of approximately 12 inches and where each end of the bladder is gathered to fit around the 12-inch launcher tube and secured by banding like that of a hose clamp. However, the size results in folds along the circumference of the bladder.

The folds can create problems. The main bladder, having a diameter twice that of the launcher, can rotate, even when rubber bands have been used to restrict the rotation of the main bladder. Furthermore, the launcher and bladder are combined with a main and lateral resin absorbent lining, and the assembly is robotically positioned in the main pipe where the lateral lining is aligned with the lateral pipe. As air pressure is applied to the main bladder, the bladder begins to inflate and the folded sections of the bladder contact the main liner and the pipe in sporadic locations around the interior circumference of the main lining and the main pipe. This can result in the liner assembly moving or rotating such that the lateral lining is no longer in alignment with the lateral pipe.

In addition, the main bladder can contact the inner pipe wall for a distance nearly equal to the distance between the bandings at the ends of the launcher. In order for the reinforced bladder to achieve this pipe surface contact, the main bladder must be longer than the distance between the banding measures. This is done so as to provide a mainline bladder having a length that is equal to the distance between the bandings, while accounting for the distance from the exterior surface of the launcher to the interior surface of the pipe. For example, if the distance between the bands is 34 inches, and the distance from outer surface of the launcher to the inner surface of the pipe is 6-inches at each end, the repair would require a bladder having a length of approximately 46-inches. This is not accounting for the amount of bladder at the bandings.

However, the excess bladder material allows the bladder to slide or move along the length of the launcher in either direction as the launcher and liner assembly are positioned in the pipe. The liner may contact the pipe walls, and the liner can shift on the bladder, and/or the bladder can shift on the launcher. For example, some pipes have slight bending or offset joints, which typically do not prevent the lining equipment and materials from passing through the pipe, but which could cause the liner to become out of communication with the bladder, and likewise the bladder out of communication with the launcher.

Furthermore, the positioning of the assembly can be accomplished by using a self-propelled robot having an attachable and detachable connecting device for connecting the robot to a launcher and a camera that displays video of the robot's work to technicians who control the robot from outside of the pipe. The launcher can be outfitted with a flexible spring or a laser that is in perfect alignment (12:00 clock reference) of the lateral liner. In this example, the distance from the spring or laser (or a similar device) to the first side of the lateral liner can be 23-inches, which is a measurement the technician will use for robotic positioning. The method involves moving the robot and connected launcher through the pipe until the spring, laser, or the like is aligned with the center of the lateral pipe. The launcher can then be moved so the spring or laser makes contact at the first side of the lateral pipe, and then the launcher can be moved 23 inches so the lateral liner is aligned with the lateral pipe.

The method works so long as the main bladder does not move substantially relative to the launcher, and the liner does not move substantially relative to the bladder. Any rotation of the launcher can affect the accuracy of the pipe repair. The longitudinal movement is also an issue as the launcher and liner are moved through the pipe. Any longitudinal movement of the bladder can slide can affect the technician who uses 23 inches for his or her measurement. The problem can also arise when a sealing gasket is used, as the gasket may also slide or otherwise move such that the lateral liner and the gasket are no longer in communication.

There is therefore, a need in the art for a method and means for lining a pipe that mitigates the likelihood that a liner and/or bladder assembly will move prior to repairing the pipe and after alignment.

SUMMARY OF THE INVENTION

Therefore, it is principal object, feature, and/or advantage of the present invention to provide an apparatus that overcomes the deficiencies in the art.

It is another object, feature, and/or advantage of the present invention to provide a method and means for mitigating or preventing the rotating of a liner and bladder assembly on a launcher device while repairing a pipe.

It is yet another object, feature, and/or advantage of the present invention to provide a system to provide for an even expansion of a main bladder during inflation.

It is still another object, feature, and/or advantage of the present invention to provide an assembly to allow the full length of a main liner to be pressed against a main pipe line.

It is a further object, feature, and/or advantage of the present invention to provide a method and means for aligning a lateral bladder and liner with a lateral pipe.

It is still a further object, feature, and/or advantage of the present invention to provide a method to provide a frangible connection between components of a repair assembly to aid in aligning the components with the pipes to be repaired.

These and/or other objects, features, and advantages of the present invention will be apparent to those skilled in the art. The present invention is not to be limited to or by these objects, features and advantages. No single embodiment need provide each and every object, feature, or advantage.

Therefore, according to one aspect of the invention, the main bladder may be frangibly connected to the launcher. The frangible connection reduces the likelihood of the bladder rotating or sliding longitudinally relative to the launcher. The frangible connection may be accomplished by a snap or snaps being outfitted on the launcher. Likewise, the main bladder may have snaps in a similar location as the placement of those located on the launcher. The snaps can be connected to one another such that continued inflation of the bladder will cause the snaps to become disconnected from one another, separating the bladder and launcher at that location. Small pieces of bladder material may be bonded to the interior of the main bladder, with a snap punched through a portion of the material. The snaps can be added to the launcher in any manner, such as by adhesive, welding, or the like. The assembly allows the bladder to be snapped in-place on the launcher to aid in keeping the position of the bladder on the launcher as the launcher and bladder are moved through the pipeline. In a similar manner, the liner can be frangibly attached to the exterior surface of the bladder. A sealing gasket can also be attached to the assembly using a frangible connection.

Other materials besides snaps may be used to create the frangible connection between the two or more components. For example, the components, such as the bladder and launcher, can be frangibly connected by an adhesive, stitching, hook and loops, bonding, or generally any other manner that provides for a connection that can be broken upon continuous force. Furthermore, the amount of and location of the frangible connection can also be varied depending on factors such as the size of the pipe repair and conditions (weather, humidity, material around the pipe) for the particular pipe being repaired.

Another aspect of the present invention includes the use of a non-reinforced, elastic main covering that is sized approximately equal to or smaller than that of the outer dimension of the launcher. Thus, the covering may be tubular-shaped. The elastic main covering is generally without folds so that as the inflatable bladder is inflated, the unfolding portions of the bladder simply stretch the outer covering such that the liner and the pipe are not in contact with the folds. An advantage is that the liner is in contact with a smooth surface. This reduces the likelihood that the launcher will rotate, and also provides a relatively smooth and slick interior surface for the liner. Another advantage is that the covering is configured to aid in the uniform inflation of the liner, as it would reduce the likelihood that one portion of the bladder will be inflated faster than other portions.

DETAILED DESCRIPTION OF THE PREFERRED EMBODIMENTS

Figure 1:
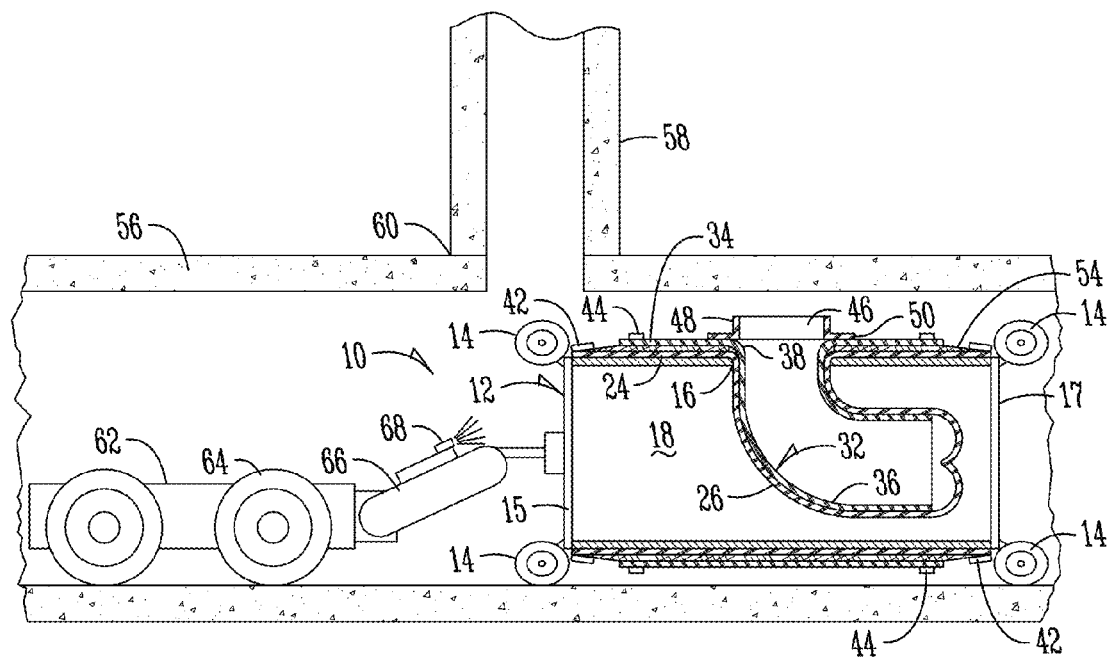
FIG. 1 is a side sectional view of a repair assembly positioned in a main pipe and used to repair a main and lateral pipe.

FIG. 1 shows a side sectional view of a repair assembly 10 positioned in a main pipe 56 and that is used to repair a main pipe 56 and lateral pipe 58 including the junction 60 there between. Such pipes are generally used in residential and commercial areas as sewer pipes. However, it should be appreciated that the present invention is not limited to the specific pipe structure shown in the figures, and it is contemplated that any type of pipe or pipe-like structure can be repaired with the repair assembly 10 of the present invention. For example, while the figures show a generally tee shaped pipe system, it should be appreciated that the repair assembly 10 of the present invention can also be used with wye shaped or other obtuse angled pipe structures.

The repair assembly 10 shown in FIG. 1 includes a launcher device 12 attached to a robotic positioning device 62. The robotic positioning device 62 is used to move the launcher device 12 and other components of the repair assembly 10 through the main pipe 56 to align a lateral bladder 26 and lateral liner 36 such that the lateral bladder and liner extend from the main pipe 56 and into a lateral pipe 58. The launcher device 12 is a tube shaped member having a first end 15, an opposite second end 17, and a launcher device body there between. The first end 15 of the launcher device 12 may be open and can be closed with a cap, while the second end 17 is generally a closed end. The launcher device 12 also includes a launcher device opening 16 providing access to a cavity 18 in the launcher device body. As will be understood, the lateral bladder tube 26 and lateral liner tube 36 can be inserted or inverted into the cavity 18 in the launcher device 12 via the launcher device opening 16.

Wheels 14 are positioned at the first and second ends 15, 17 of the launcher device 12 and arranged radially about the ends of the device such that the wheels 14 aid in moving the launcher device 12 through the main pipe 56. The number and configuration of wheels is not to be limiting to the present invention. Furthermore, as can be seen best in FIG. 2, the launcher device body may include a plurality of frangible connections 20, such as snaps, adhesive strips, loop and hooks, buttons, or the like. As will be discussed, the frangible connections 20 of the launcher device 12 provide a frangible connection for a bladder assembly 22 such that the frangible connections 20 of the launcher device will aid in maintaining the orientation of the bladder assembly 22 relative to the launcher device 12 such that the bladder assembly 22 will not move such as by rotating relative to a launcher device 12.

Figure 2:
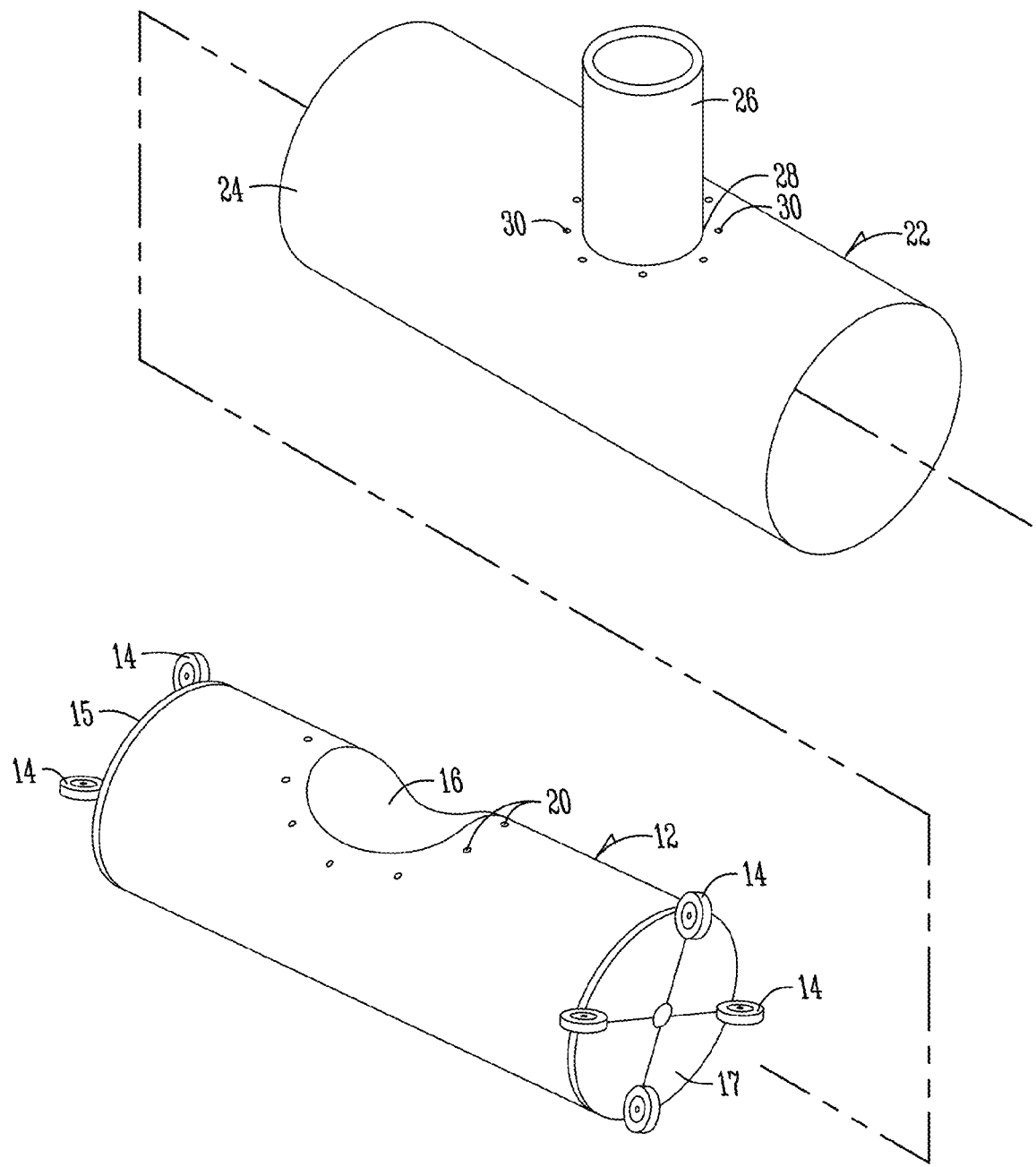
FIG. 2 is an exploded view of a launcher device and bladder assembly for use with an aspect of the present invention.
Figure 3:
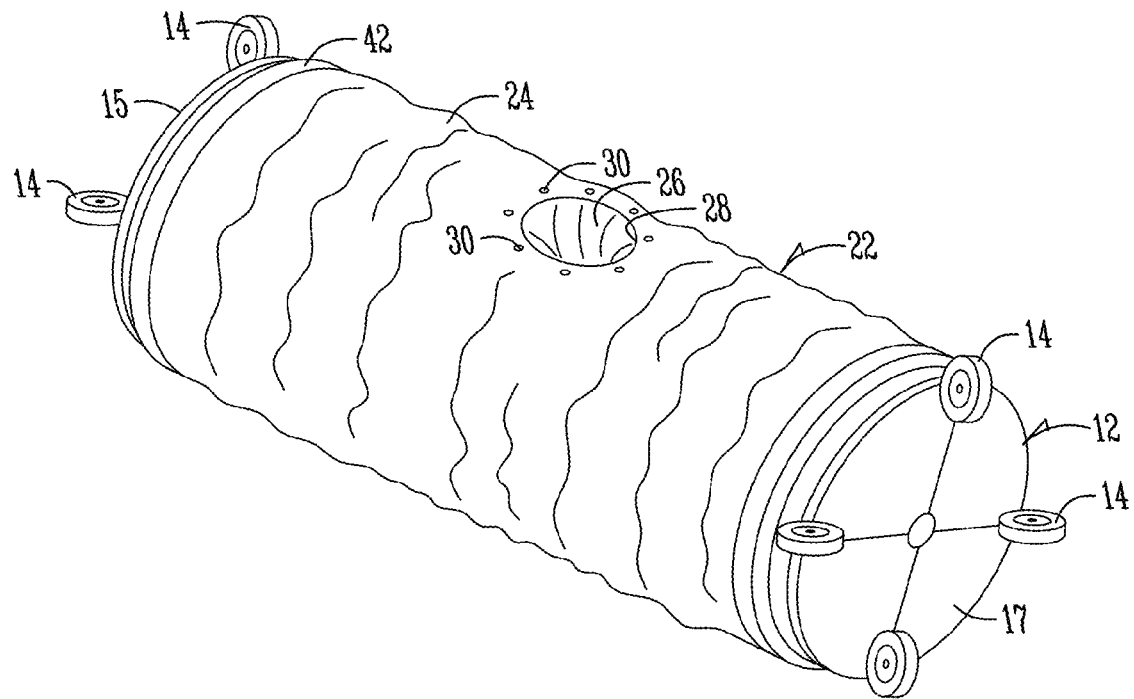
FIG. 3 is a perspective view of a bladder assembly being positioned on a launcher device.
Figure 4:
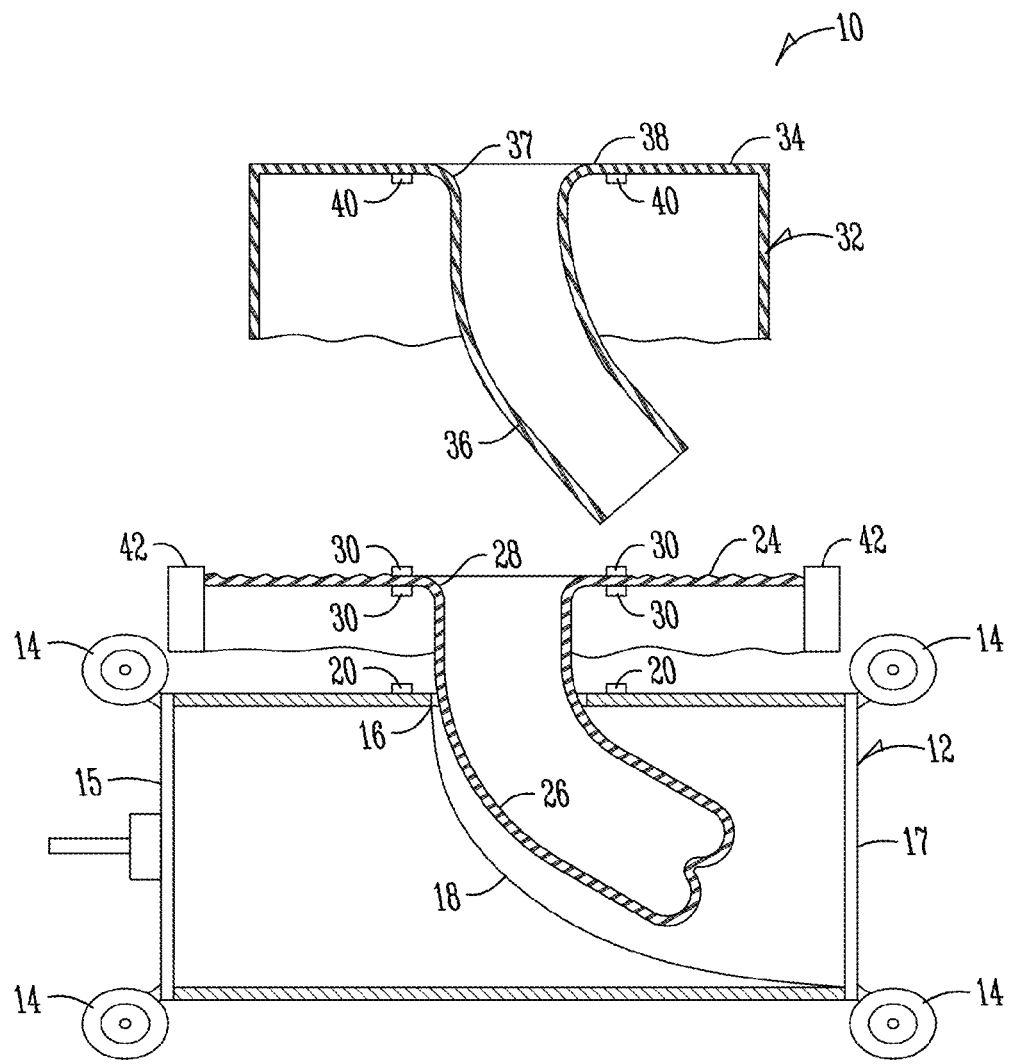
FIG. 4 is an exploded view of a repair assembly according to an aspect of the present invention.

A bladder assembly 22 is included with the repair assembly 10. As shown in FIGS. 1-4, the bladder assembly 22 includes a main bladder tube 24 and a lateral bladder tube 26 extending from the main bladder tube 24 about a main bladder tube opening 28 therein. The main and lateral bladders 24, 26 may be fluidly connected to one another, or they may each have their own respective air supply conduits such that they can be inflated independent of one another. The main and lateral bladders 24, 26 may also include a scrim-reinforced member positioned generally at the exterior of the bladders. It is contemplated that the lateral bladder tube 26 of the bladder assembly 22 be configured to be inverted or inserted through the main bladder tube opening 28 such that it can be positioned within the cavity 18 of the launcher device 12. The main bladder tube 24 is positioned to at least partially surround the launcher device 12, as shown in FIGS. 1, 3 and 4. During inflation, the lateral bladder tube 26 can evert through the launcher device opening and into the lateral pipe 58.

The diameter of the main bladder tube 24 will generally be larger than the diameter of the launcher device 12. The larger diameter of main bladder tube 24 allows the bladder to be inflated to press against the full diameter of the main pipe 56. For example, according to an aspect of the invention, the launcher device 12 may have an outer diameter of approximately 12 inches, while the main bladder tube 24 has an inner diameter or approximately 21 to 24 inches (when the pipe diameter is 21 to 24 inches). The inner diameter of the main bladder tube 24 may be approximately twice that of the outer diameter of the launcher device 12. This will allow a smaller launcher device to be moved through a pipe having a larger diameter than the outer diameter of the launcher device 12, while still providing that the bladder will press a main liner member against the larger diameter pipe.

As shown in the figures, each end of the main bladder tube 24 can be gathered to fit around the launcher device 12 and can be secured thereto by a banding 42, such as by use of a hose clamp and/or tape or adhesive. The banding will provide a fluid tight seal at the ends of the main bladder tube 24 to seal the main bladder tube 24 against the launcher device 12, while still allowing a larger diameter main bladder 24 to be used to be inflated in the pipe, i.e., the length of the bladder between the bandings. However, it should be noted that the banding 42 can result in folds along a circumference of the main bladder tube 24 along the length of the tube, as is generally shown in FIG. 3. A problem is created such that the folds may allow the bladder assembly 22 to move, such as in a rotational or longitudinal manner. This is especially sensitive during inflation of the bladder. However, an aspect of the invention, as will be discussed, provides for the bladder assembly 22 to be inflated in such a way that it is not moved relative to the launcher device 12, and also includes a generally smooth surface to press a liner assembly against the walls of the main and lateral pipes 56, 58.

A way to provide that the position of the bladder assembly 22 is not rotated or moved longitudinally in relation to the launcher device 12 includes providing a frangible connection between a portion of the main bladder tube 24 or lateral bladder tube 26 and the launcher device 12. As shown in FIGS. 2 and 3, the launcher device 12 includes a plurality of frangible connections 20 positioned generally around the launcher device opening 16. Similarly, the interior of the main bladder tube 24 may include a plurality of frangible connections 30 that is configured to be frangibly connected to the frangible connections 20 of the launcher device 12. For example, the frangible connections 20, 30 may include snaps that allow the main bladder tube 24 to be snapped to the launcher device 12 to frangibly connect the tube in place relative to one another. This will aid in providing that the bladder assembly 22 does not move, either rotationally or longitudinally, relative to the launcher device during transport and positioning of the repair assembly 10. However, as the connection is frangible between the bladder assembly 22 and the launcher device 12, the connection between the frangible connections 20, 30 can be broken upon continued inflation pressure during inflation of the assembly. Thus, as shown in FIGS. 2 and 3, the bladder assembly 22 can be positioned generally surrounding the launcher device 12, the frangible connections 20, 30 can be frangibly connected to one another, and the ends of the main bladder tube 24 can be banded by bands 42 to provide a general fluid tight seal between the bladder assembly 22 and the launcher device 12.

Also included in the repair assembly 10 is a liner assembly 32. The liner assembly 32 includes a main liner member 34 and a lateral liner tube 36 fluidly sealed to the main liner member 34 and extending from a main liner member opening 38. The main liner member 34 may be a tube, or may be a rectangular or circular member that can be folded to at least partially surround the main bladder tube 24, as is shown in FIGS. 1 and 4. In addition, the lateral liner tube 36 is configured to be inverted through the main liner member opening 38 and positioned generally within the lateral bladder tube 26. The main and lateral liners 34, 36 comprise a resin absorbent material, such as felt or felt-like materials. The liners may also include a coating on one side, such as a resin and fluid impermeable coating. The coating may be a plastic or elastomer material such that resin or fluids are not able to pass therethrough.

Prior to surrounding the bladder assembly 22, the resin absorbent layers of the main and lateral liners 34, 36 are impregnated with a material capable of curing and hardening, such as a resin or resin-type material. The liner assembly 32 is put in position at the bladder assembly 22 with the lateral liner tube 36 positioned generally within the lateral bladder tube 26. The resin impregnable layer of the lateral liner tube 36 will be positioned on the interior of the lateral liner tube 36 when in the configuration shown in FIG. 1, and when an impermeable layer is also provided. Straps 44, such as hydrophilic or hydrophobic straps, may be positioned generally surrounding the main liner member 34 to further hold the liner assembly 32 in place relative to the bladder assembly 22 and/or launcher device 12. The straps 44 may be elastic such that they are able to expand as the main bladder tube 24 expands to press the main liner member 34 towards the wall of the main pipe 56. However, it should be appreciated that the straps 44 need not be needed in all embodiments.

In addition, as shown in FIG. 4, the liner assembly 32 may include frangible connections 40 on both the interior and exterior of the main liner member 34 and/or lateral liner tube 36. The interior connections 40 are configured to match the bladder connections 30 on the exterior of the main bladder member 24. The connections 30, 40 are able to frangibly connect to one another such that the liner assembly 32 will maintain its position relative to the bladder assembly 22 during transport and positioning of the repair assembly 10 in the pipe. Similar to the other connections, the liner connections 40 may be snaps, buttons, adhesives, hook and loops, or the like. Furthermore, the main liner member 34 may also include connections 40 on the exterior of the main liner member 34, which can connect to a gasket 46 used to seal the junction 60 between the main and lateral pipes 56, 58. The gasket 46 may be a hydrophilic or hydrophobic material and can include a tube portion 48 and a flange portion 50 extending from one of the ends of the tube portion 48. The gasket can also include frangible connections 52 to be associated with the connections 40 of the main liner member 34 in order to frangibly connect the gasket 46 to the main liner member 34.

FIG. 4 shows that the bladder assembly may be positioned such that it is at least partially surrounding the launcher device 12, while being frangibly attached to the launcher device 12 to reduce or mitigate the likelihood of rotational or longitudinal movement during transport and positioning of the repair assembly 10. The lateral bladder tube 26 is inverted to within the cavity 18 of launcher device 12. Furthermore, the liner assembly 32 is configured to at least partially surround the bladder assembly 22. The liner assembly 32 can be frangibly connected to the bladder assembly 22 via the connections to aid in reducing or mitigating the chance of movement of the liner assembly 32 relative to the bladder assembly 22. The lateral liner tube 36 is inverted to within both the cavity 18 of the launcher device 12 and the lateral bladder tube 26. While inflation of the bladder assembly 22 will break the frangible connection between the bladder assembly 22 and the launcher device 12, the frangible connection between the liner assembly 32 and the bladder assembly 22 can be broken after the material has cured and hardened in the pipe. At such a time, the bladder assembly 22 can simply be pulled away from the liner assembly to break the frangible connection between the two to leave the liner assembly 30 to remain within the main and lateral pipes 56, 58, thus repairing the pipes.

Also shown in FIG. 1 is a robotic positioning device 62 including a plurality of wheels 64. The robotic positioning device 62 is connected to the repair assembly 10 via connector 66. The robotic positioning device 62 is used to move the repair assembly 10 through a pipe and to align the lateral liner and bladder 36, 26 with the lateral pipe 58. To aid in such alignment, a camera 68 may be included with the robotic positioning device 62.

Figure 5:
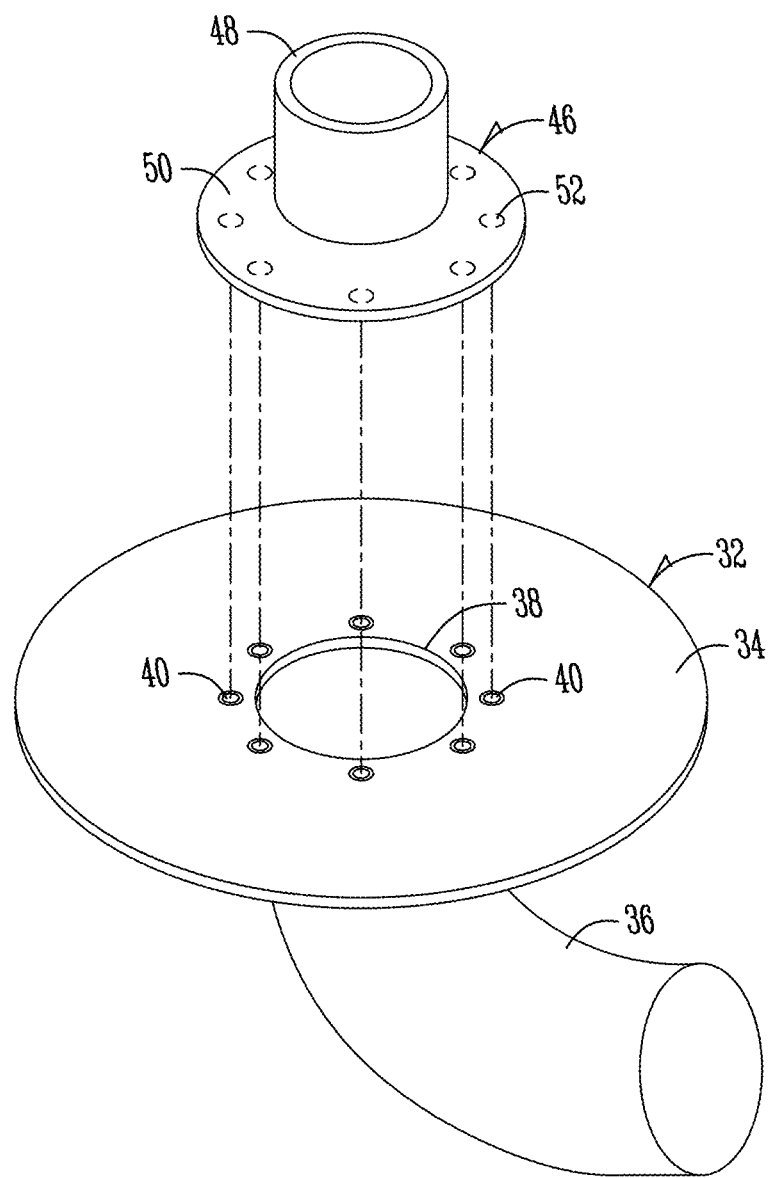
FIG. 5 is a partial exploded view of another aspect of a repair assembly according to the present invention.

FIG. 5 is a partially exploded view of another aspect of the repair assembly showing the use of a gasket 46 frangibly connected to a liner assembly 32. As mentioned, the gasket 46 can comprise a compressible hydrophilic or hydrophobic material. Furthermore, the gasket 46 may comprise an absorbent material such that it can be impregnated with a hydrophilic or hydrophobic material. The liner assembly 32 shown in FIG. 5 includes a generally circular main liner member 34 with a lateral liner tube 36 extending from a main liner member opening 38. The main and lateral liner members 34 and 36 are fluidly attached to one another at a liner juncture. The configuration shown in FIG. 5 may generally be known as a top hat type configuration such that the main liner member 34 is not formed into a tube, but includes a circular member that can be wrapped at least partially around the main bladder member 24. Furthermore, the exterior of the main liner member 34 includes a plurality of frangible connections 40, which may be snaps, adhesives, hook and loops, or the like. Likewise, the underside of the gasket 46 may include like frangible connections 52 that match the frangible connections 40 of the liner assembly 32. Therefore, the gasket 46 can be frangibly connected to the liner assembly 32. FIG. 5 shows the gasket 46 having a tube portion 48 and a flange portion 50, with the connections 52 positioned on the underside of the flange portion 50. However, the gasket 46 may simply comprise a tube or flange portion, with the connections 52 on just one of the members.

An aspect of the present invention includes the addition of frangible connections to reduce the likelihood of the bladder assembly 22 or liner assembly 32 moving either longitudinally or rotationally relative to each other and/or the launcher device 12. Accordingly, the bladder assembly 22 may be frangibly connected to the launcher device 12 such that the position of the bladder assembly 22 on the launcher device 12 will be maintained until the frangible connection is broken, such as during inflation of the bladder assembly 22. An embodiment to provide the frangible connection includes the use of a snap or snaps being outfitted on the launcher 12. The figures show the location of the snaps 20 at a location approximately where the lateral bladder tube 26 is in communication with the main bladder tube 24, i.e., at the juncture between the main and lateral bladders. Mating snaps may be attached to the bladder assembly 22 that mirror the placement of those on the launcher 12 such that the bladder assembly can be attached or snapped to the launcher device 12 to create the frangible connection. To add snaps to the bladder assembly 22, small pieces of bladder material may be bonded to the interior of the main bladder member 24 with at least one end fused to the bladder and a snap punched through a portion of the extra piece of material. The mating snap may be connected to the launcher device by welding, adhesive, or the like, such that the position of the snap is generally fixed in place at the launcher device 12. Therefore, when placing the bladder assembly on the launcher device 12, the snaps of the launcher device are connected to the snaps of the bladder assembly to provide a frangible connection between the two components of the repair assembly 10. The frangible connection will aid in providing the correct position for the bladder assembly 22 on the launcher device 12 until inflation of the bladder assembly 22 breaks the frangible connection to allow for full inflation of the bladder assembly 22 and repair assembly 32.

The small pieces of material bonded to the main bladder member can be perforated and can comprise urethane film, PVC film, or the like. The material has a portion of it permanently bonded to the inner coating of the main liner and the remaining portion of the strip is connected to the bladder where the strip is perforated exactly at the edge of the bonded portion to the main liner so when the bladder is removed the strip breaks clean at the perforated strip section.

While snaps have been described as providing the frangible connection between the components of the repair assembly 10, it is to be appreciated that other methods and means may be provided for providing such frangible connection. For example, an adhesive, such as a light adhesive that can be broken, hook and loops, stitching, couplings, welding, or otherwise frangibly bonding the bladder assembly to the launcher device may be used and are contemplated by the present invention. The exact manner and method of providing the frangible connection between the bladder assembly and the launcher device are not to be limiting to the present invention.

In a similar manner, the liner assembly 32 may be frangibly attached to the exterior surface of the bladder assembly 22. For example, while one set of snaps are included on the interior of the main bladder member 24, a separate set of snaps may be included around the main/lateral juncture on the exterior of the bladder assembly 22. Likewise, a set of snaps may be included at the interior of the main liner member/lateral liner tube juncture of the liner assembly 32 that can attach to the snaps on the exterior of the bladder assembly 22. The snaps can be connected to create a frangible connection such that the positioning between the bladder assembly 22 and the liner assembly 32 can be maintained during transport and positioning of the repair assembly 10 in the pipe, as well as during inflation of the bladder assembly 22. However, the frangible connection between the bladder assembly 22 and the liner assembly 32 can be broken to remove the bladder 22 from the liner assembly 32 after the liner assembly 32 has been positioned in the main and lateral pipes such that the liner assembly 32 can be left within the main and lateral pipes to create a repaired pipe surface. This is shown generally in FIGS. 6 and 7.

Figure 6:
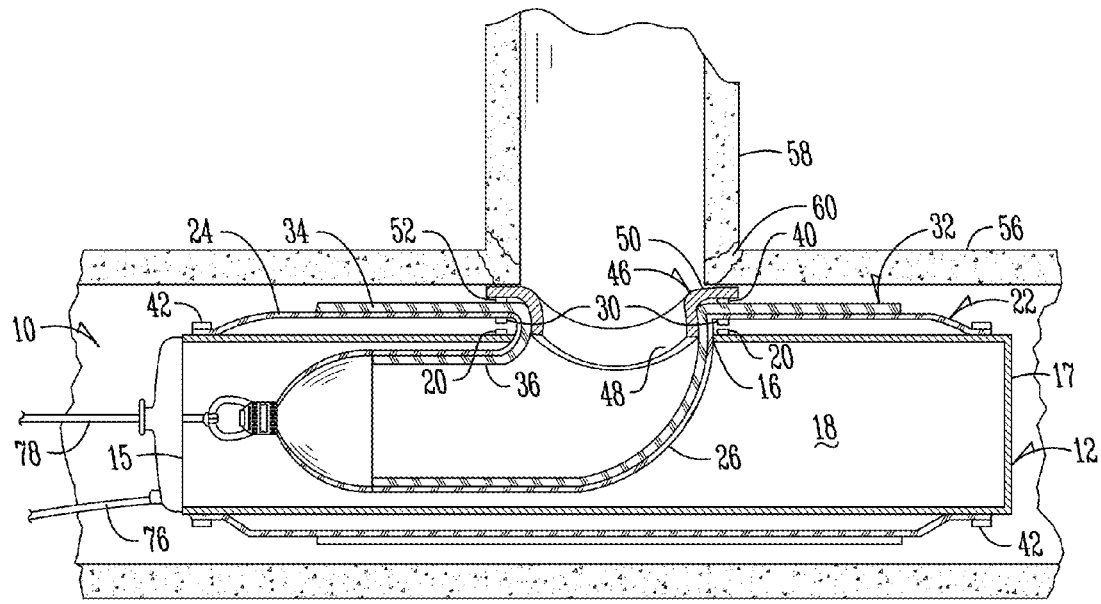
FIG. 6 is a side sectional view of a repair assembly according to the present invention.
Figure 7:
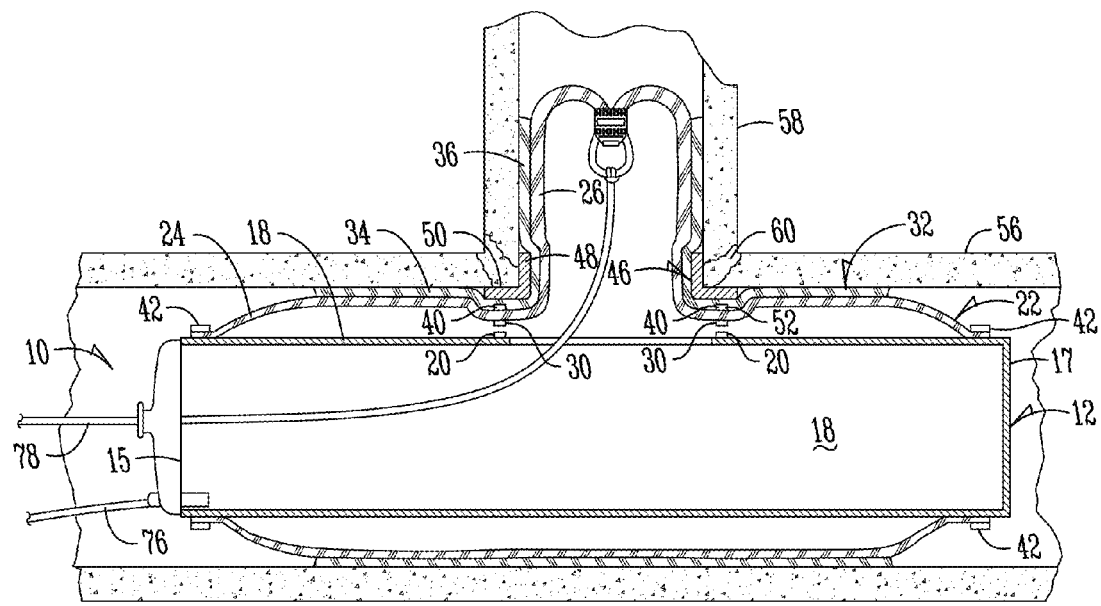
FIG. 7 is a view similar to FIG. 6, but with the bladder assembly inflated.

FIG. 6 shows the repair assembly 10 positioned in the main pipe 56 with the lateral bladder tube 26 and lateral liner tube 36 positioned generally adjacent the lateral pipe 58. Air, or another fluid, can be provided via the hose 76 to inflate the bladder assembly 22 to press the main liner member 34 against the wall of the main pipe 56. The continued addition of fluid will cause the lateral bladder and liner tubes to evert through the openings and into the lateral pipe 58 to the position shown in FIG. 7. The inflation of the bladder assembly 32 will break the frangible connection between the bladder assembly 22 and the launcher device 12. The inflation pressure is maintained until the material impregnated into the liner assembly 32 is allowed to cure and harden. At such time, a rope 78 may be pulled to remove the bladder assembly 22 from the liner assembly 32, thus breaking the frangible connection between the assemblies. FIGS. 6 and 7 also show the use of a gasket 46 positioned at the juncture 60 of the main and lateral pipes 56, 58 to further repair and provide sealing at the juncture 60.

The components of the repair assembly 10 may be frangibly connected to one another during transport and inflation of the repair assembly 10. The frangible connection between the components aid in preserving the correct position of the component such that a higher accuracy will be provided to insert the lateral bladder 26 and liner 36 into the lateral pipe 58. In addition, it should be appreciated that not all of the components need be frangibly connected to one another to provide such benefits of correct positioning. For example, it is contemplated that only the bladder assembly 22 be frangibly connected to the launcher device 12. In such a configuration, the liner assembly and gasket need not be frangibly connected to anything to provide for correct positioning of the assembly during inflation into the lateral pipe.

Figure 8:
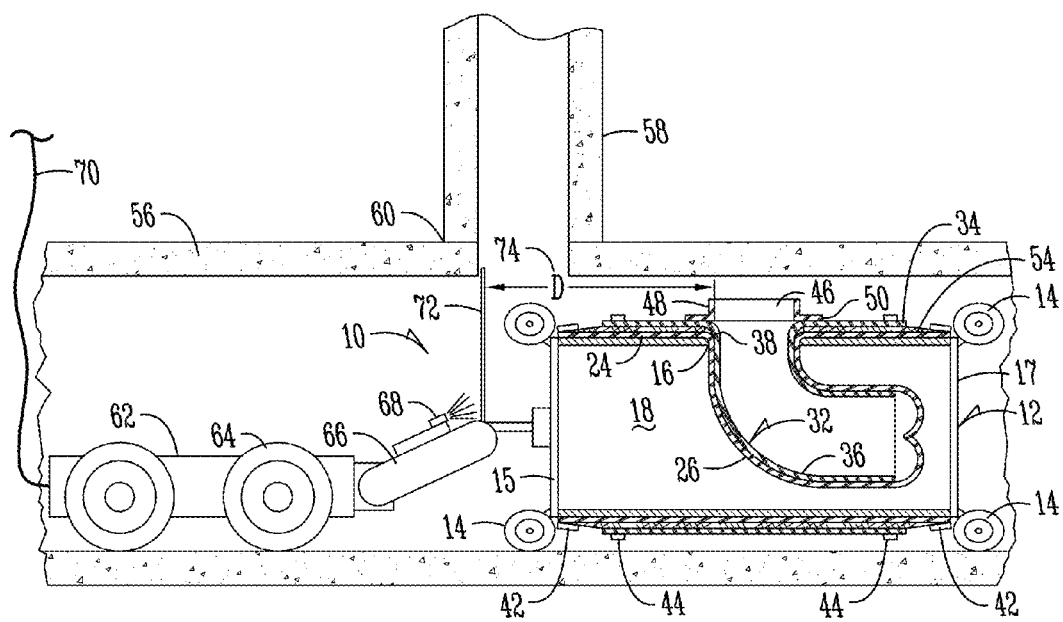
FIG. 8 is a side sectional view of a repair assembly in a pipe according to the present invention.

Further use of the repair assembly 10 as has been described may be as followed in relation to FIGS. 6-8. The bladder assembly 22 is positioned on the launcher device 12 and banded with bands 42 at both ends to seal the ends of the main bladder 34. The lateral bladder tube 26 is inserted through the launcher device opening 16 and into the cavity 18 within the launcher device body. The liner assembly 32 is impregnated with a resinous material capable of curing and hardening such as by a wet out process as is known in the art. The resinous material may be a thermosetting resin, a photo curing resin, or other resins capable of curing and hardening. The liner assembly 32 is positioned with the main liner member 34 at least partially surrounding the main bladder tube 24, and the bladder assembly 22 is frangibly attached to the launcher device 12. The liner assembly 32 may also be frangibly attached to the bladder assembly 22. The lateral liner tube 36 is inserted through the main bladder tube opening 28 and launcher device opening 16, and is positioned generally within the lateral bladder tube 26. A sealing gasket 46 may then be positioned at or on the liner assembly 32, and can be frangibly connected thereto. A robotic positioning device 62 is attached to the repair assembly 10 to remove the repair assembly 10 in position in the main pipe 56, such that the launcher device opening 16 is positioned to be adjacent to lateral pipe opening.

The robotic insertion and position is accomplished using a self-propelled robotic positioning device 62 having a detachable connecting device 66 for connecting the robot to the repair assembly 10. The robot also includes an operatively moving camera 68 that displays video within the pipe to a technician external of the pipe, which controls the robot 62. Attached to the launcher and/or robot is a guide member 72, such as a flexible spring or laser that is aligned at approximately a 12 o'clock position, i.e., straight in one direction. The positioning of the guide member 72 is generally aligned with the axis of the lateral liner 26. The guide member 72 is positioned a known distance from a first side 37 of the lateral liner tube 36 when the lateral liner tube is inflated. The known distance 74 is generally shown by the letter D in FIG. 8. For example, the guide member 72 may be positioned approximately 23 inches from the first side 37 of the lateral liner tube 36 to provide the technician with a known distance.

The robot 62 and repair assembly 10 are moved within the main pipe 56 until the guide member 72 is aligned with a first edge of the lateral pipe 58. The technician or operator will then know to move the robot 62 approximately 23 inches (or other known and set distance) to position the first edge of the lateral liner tube 36 in alignment with the first edge of the lateral pipe 58. This may be accomplished by pulling a cable 70 attached to the robot 60 taut at the outside of the pipe while the guide member 72 is aligned with the first edge of the lateral pipe 58. A marking is placed on the cable 70 to indicate a first position. The robot 62 is then backed or otherwise moved until the known distance D has passed for the cable (e.g., 23 inches) such that the technicians will know that the robot 62 has moved the repair assembly 10 the known distance within the pipe. At this point, the lateral liner and bladder tube should be aligned with the lateral pipe such inflation of the bladder assembly 22 will evert the lateral bladder tube and liner tube 26, 36 from within the cavity 18 of the launcher device 12 and into the lateral pipe 58. The frangible connections between the components of the repair assembly 10 will aid in maintaining the alignment of the components, as the frangible connection will lower the possibility of the bladder assembly 22 and/or liner assembly 32 moving during transport and positioning of the repair assembly 10 to the location needed to invert into the lateral pipe 58.

Once the repair assembly is positioned, an inflation source, such as air, steam, or another fluid, is added to the bladder assembly 22 to inflate the bladder assembly such that the main bladder member 24 presses the main liner member 34 against the wall of the main pipe 56 and the lateral bladder tube 26 presses the lateral liner tube 36 against the interior wall of the lateral pipe 58. When the sealing gasket 46 is used, the bladder assembly 22 will also press the sealing gasket 46 against an area of the junction 60 between the main and lateral pipes to aid in sealing said junction. The inflation is continued in the bladder assembly until the material capable of curing and hardening impregnated into the liner assembly 22 has cured and hardened, which creates a repaired wall for the main pipe, lateral pipe, and junction between the pipes. Furthermore, the sealing gasket 42 will provide further sealing at the junction 60 of the main lateral pipes.

Another aspect of the present invention provides for the prevention of sporadic inflation of folds of the main bladder member 24 from affecting the alignment inflation of the liner assembly 32. A non-reinforced elastic cover 54 may be used with the repair assembly 10. The elastic cover 54 may be a non-reinforced, tubular elastic covering that is sized approximately equal to or smaller than the outer diameter of the launcher device 12. The elastic covering 54 may be a tubular member such that the cover is positioned to surround the main bladder tube 24. In addition, the elastic cover 54 will include an elastic cover opening that will align with the launcher device opening 16, main bladder tube opening 28, and main liner member opening 38. As the elastic cover is similar to the outer diameter of the launcher device 12, the cover 54 will be without folds along the length of said cover 54. Therefore, this will account for the folds created in the main bladder tube 24 due to the diameter of the main bladder tube 24 being almost double the diameter of the launcher device 12. Thus, as the bladder assembly 22 is inflated, the unfolding portions of the main bladder tube 24 stretch the elastic cover 54 such that the main liner member 34 and the inner wall of the main pipe 56 are not in contact with the sporadically inflating folds of the main bladder tube 24. The main liner member 34 is in contact with a smooth surface along the length of the main liner member 34 during inflation of the bladder assembly 22.

An advantage of using the elastic cover 54 is that it aids in reducing the likelihood that the launcher 12 and or bladder assembly 22 will rotate from the sporadically inflating folds of the main bladder tube 24, while also providing a smooth interior surface for the main liner member 34 to be pressed against during inflation. In addition, the present invention contemplates that the elastic cover may also include frangible connection components such that the elastic cover may be frangibly connected to the bladder assembly 22, such that the liner assembly 32 can be frangibly connected to the elastic cover 54 to further aid in retaining the position of the components on the launcher device 12 to retain the alignment of the components of the repair assembly 10.

In addition, the main bladder tube 24 may also comprise an elastic material such that the diameter of the main bladder tube 24 can be reduced to be approximately the same as the launcher device 12. In such an embodiment, the bladder 24 could still be banded at its ends to the launcher 12. However, as the diameters are substantially equal, there would be substantially no folding of the bladder 24. Therefore, as the main bladder 24 is inflated, there would be the smooth surface pressing against the main liner member 34 to press the liner against the wall of the pipe. The main bladder tube 24 could comprise a material to allow it to expand during inflation to at least approximately the same diameter of the pipe to press the liner against said pipe or conduit.

It should be understood that various changes and modifications to the embodiments described herein would be apparent to those skilled in the art. Such changes and modifications may be made without departing from the spirit and scope of the invention, and without diminishing its intended advantages. For example, the location and types of frangible connections may be varied according to the size and type of materials used for the repair assembly. Furthermore, the addition and subtraction of components from the repair assembly may be varied as well. For example, the sealing gasket may not be included in all embodiments. Furthermore, the configuration of the gasket may be varied. The configuration of the aligner assembly may also be varied such that the main liner member may be a tube and/or flange-type tube, flange-type member, rectangular, square, or the like. The exact configuration of the main liner member is not to be limiting to the invention. Furthermore, additional components, such as additional cameras, hydrophilic bands at the end of the main liner members, and/or lateral liner member, and the like may be included with the present invention.

Other variations may include how the repair assembly is positioned and inflated in the pipes. For example, the repair assembly may be pulled in place, instead of being positioned by the robot. Furthermore, the lateral bladder and lateral liner may be pulled in place through the lateral pipe, instead of being everted from within the launcher device. Still other variations may include the sealing gasket comprising a hydrophilic paste spread at or around the juncture of the main and lateral liners with a portion of the paste being disposed on either or both of the main and lateral liners. As mentioned, the bladders may also be separate such that they are independently inflated.

What is claimed is:

1. A method of repairing a junction between a main and lateral pipe, comprising:
   providing a repair assembly comprising a launcher device, a bladder assembly at least partially surrounding and including a portion that is frangibly connected to the launcher device and comprising a main bladder tube and a lateral bladder tube extending from a main bladder tube opening, and a liner assembly comprising a main liner member and a lateral liner tube extending from a main liner member opening to form a liner juncture, the liner assembly at least partially surrounding and frangibly connected to the bladder assembly;
   impregnating the liner assembly with a resinous material capable of curing and hardening;
   positioning the repair assembly in the main pipe with the lateral liner and bladder tubes adjacent the lateral pipe;
   inflating the bladder assembly to break the frangible connection between the bladder assembly and launcher device and to press the main liner member against the main pipe and the lateral liner tube against the lateral pipe; and
   breaking the frangible connection between the liner assembly and the bladder assembly after the material has cured and hardened to remove the bladder assembly from the pipe.

2. The method of claim 1 further comprising providing a gasket frangibly connected to the liner assembly at the liner juncture.

3. The method of claim 2 further comprising pressing the gasket against the junction between the main and lateral pipes and between the main and lateral liners and the pipe.

4. The method of claim 1 wherein the step of positioning the repair assembly in the main pipe comprises:
   moving the repair assembly in the main pipe;
   aligning a guide member having a known distance from the guide member to a first edge of a lateral liner of the repair assembly with a first edge of the lateral pipe;
   moving the repair assembly the known distance to align the lateral liner of the repair assembly with the lateral pipe.

5. The method of claim 4 wherein the guide member comprises a flexible spring.

6. The method of claim 4 wherein the guide member comprises a laser.

7. The method of claim 1 further comprising providing a cover at least partially surrounding the main bladder tube and positioned generally between the main bladder tube and the main liner member.

8. The method of claim 7 further comprising pressing the cover towards the main liner member to press the main liner member against the wall of the main pipe.

9. The method of claim 1 wherein the main bladder tube comprises an elastic material and is configured to be expanded from a diameter substantially equal to the launcher device to a diameter substantially equal to the diameter of the main pipe.

10. The method of claim 1 further comprising pulling the bladder assembly away from the liner assembly after a material impregnated into the liner assembly has cured and hardened.

11. The method of claim 1 wherein the step of inflating the bladder assembly comprises inflating the lateral bladder and the main bladder independently.

12. The method of claim 1 wherein the frangible connections comprise snaps and a perforated strip of material positioned on the launcher device, bladder assembly, and liner assembly.

13. The method of claim 1 wherein the frangible connections comprise strips of hook and loops positioned on the launcher device, bladder assembly, and liner assembly.

14. The method of claim 1 wherein the lateral bladder tube extends near the main bladder tube opening.

15. The method of claim 1 wherein the step of breaking the frangible connection occurs while the bladder assembly is removed from the pipe.

16. A method of repairing a main pipe adjacent a lateral pipe to repair a junction of the main and lateral pipes, comprising:
moving a repair assembly in the main pipe;
aligning a guide member having a known distance from the guide member to a first edge of a lateral liner of the repair assembly with a first edge of the lateral pipe;
moving the repair assembly the known distance to align the lateral liner of the repair assembly with the lateral pipe;
wherein the repair assembly comprises a launcher device, a bladder assembly at least partially surrounding and frangibly connected to the launcher device and comprising a main bladder tube and a lateral bladder tube extending from or near a main bladder tube opening, and a liner assembly comprising a main liner member and a lateral liner tube extending from a main liner member opening to form a liner juncture, the liner assembly at least partially surrounding and frangibly connected to the bladder assembly.

17. The method of claim 16 further comprising:
impregnating the liner assembly with a material capable of curing and hardening;
positioning the repair assembly in the main pipe with the lateral liner and bladder tubes adjacent the lateral pipe
inflating the bladder assembly to break the frangible connection between the bladders and launcher device and to press the main liner member against the main pipe and the lateral liner tube against the lateral pipe; and
breaking the frangible connection between the liner assembly and the bladder assembly after the material has cured and hardened to remove the bladder assembly from the pipe.

18. The method of claim 11 further comprising providing a cover at least partially surrounding the main bladder tube and positioned generally between the main bladder tube and the main liner member, and pressing the cover towards the main liner member to press the main liner member against the wall of the main pipe.

19. The method of claim 18 further comprising providing a gasket frangibly connected to the liner assembly at the liner juncture.

20. The method of claim 19 further comprising pressing the gasket against the junction between the main and lateral pipes and between the main and lateral liners and the pipe.

21. The method of claim 1 of repairing a junction wherein the frangible connection between the bladder assembly and the liner assembly is between the main bladder tube and main liner member.

* * * * *